United States Patent [19]

Bair

[11] 4,047,299

[45] Sept. 13, 1977

[54] APPARATUS FOR TRIMMING VEGETATION

[75] Inventor: Lester E. Bair, Brownsville, Tex.

[73] Assignee: Garden Pro, Inc., Dallas, Tex.

[21] Appl. No.: 653,884

[22] Filed: Jan. 30, 1976

[51] Int. Cl.² ................... A01D 55/18; B26B 27/00
[52] U.S. Cl. ........................... 30/276; 30/347; 56/12.7; 56/295
[58] Field of Search .................. 30/276, 347; 56/12.7, 56/295

[56] References Cited

U.S. PATENT DOCUMENTS

| 2,062,820 | 12/1936 | Pierce | 30/276 |
|---|---|---|---|
| 2,484,753 | 10/1949 | Shipley | 30/276 |
| 2,673,396 | 3/1954 | Beres | 30/DIG. 5 |
| 2,697,457 | 12/1954 | Lawrence | 30/264 X |
| 2,882,600 | 4/1959 | Baker | 30/301 X |
| 3,664,102 | 5/1972 | Reber | 56/295 |
| 3,693,255 | 9/1972 | Langenstein | 30/276 |
| 3,708,967 | 1/1973 | Geist et al. | 56/295 |
| 3,826,068 | 7/1974 | Ballas | 56/12.7 |
| 3,892,037 | 7/1975 | Brown | 30/264 |
| 3,928,911 | 12/1975 | Pittinger | 30/276 |

FOREIGN PATENT DOCUMENTS 1,281,450   12/1961   France ................... 30/264

Primary Examiner—Al Lawrence Smith
Assistant Examiner—J. T. Zatarga
Attorney, Agent, or Firm—Fishburn, Gold & Litman

[57] ABSTRACT

An apparatus for cutting, trimming, and edging vegetation along driveways, sidewalks, and the like; around trees, shrubs, and like landscaping; and adjacent fences, walls, posts, and the like by rotation of a non-metallic cutting line in a cutting plane substantially perpendicular to the axis of rotation. The apparatus includes a drive motor positioned in a trimmer housing at one end of an elongated handle and adapted to rotate a driven shaft and a spool member connected thereto. The spool member has a storage of non-metallic cutting line member coiled thereon with a non-coiled portion thereof extending from the spool member and through an aperture in a wall of the trimmer housing. The spool member may be moved longitudinally of the driven shaft against the resistance of a resilient member and turned relative to the driven shaft to thereby adjust the amount of the cutting line member extending through the aperture in the one wall of the trimmer housing.

7 Claims, 6 Drawing Figures

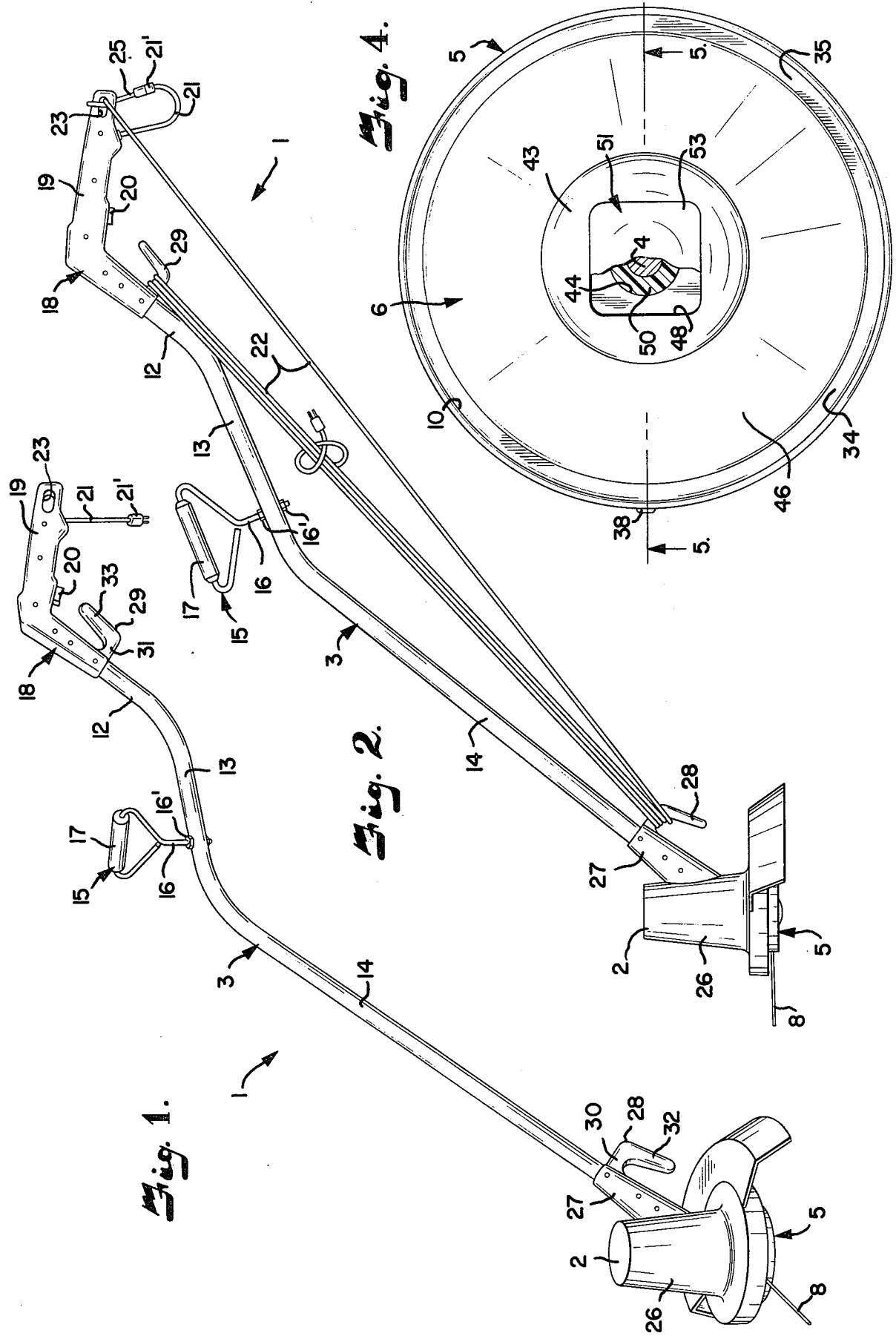

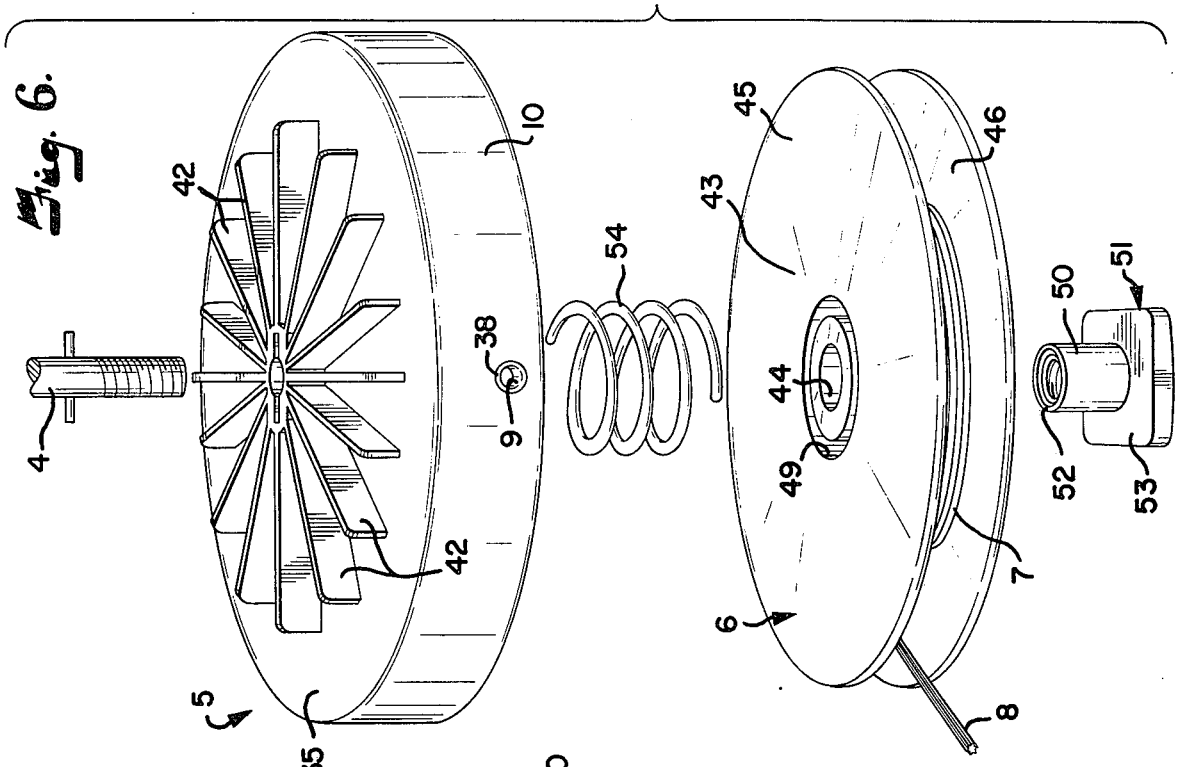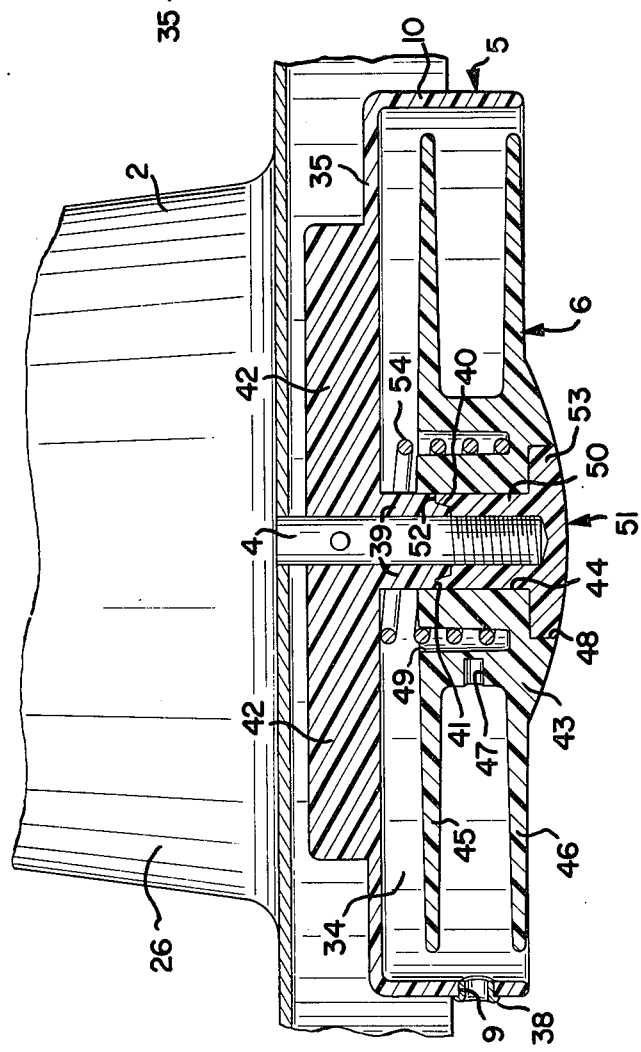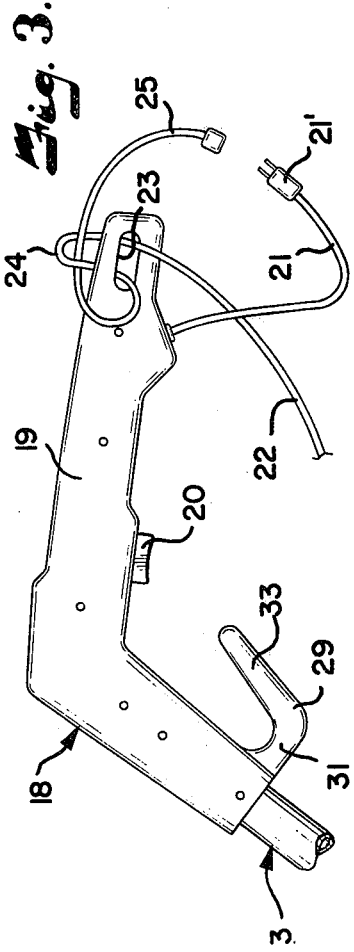

APPARATUS FOR TRIMMING VEGETATION

The present invention relates to apparatus for trimming vegetation and more particularly to a vegetation trimming aparatus having a head member operative to adjust the amount of a cutting line extending therefrom.

The principal objects of the present invention are: to provide a vegetation trimming apparatus with a rotating non-metallic cutting line for safe trimming of vegetation along drives, walks, and around trees, shrubs, and the like; to provide such a vegetation trimming apparatus having a spool member which is urged into rotation engagement by a resilient member and is moved against same to a released position to feed cutting line outwardly from a trimmer housing; to provide such a vegetation trimming apparatus having a swivel balance handle member positioned intermediate the ends of a handle thereby functioning like a fulcrum and permitting an operator to stand in one place and reach hard to get spots without awkward reaching; to provide such a vegetation trimming apparatus having an aperture in a gripping portion of the handle whereby a loop of an electrical extension cord may be positioned in the aperture and have an end portion thereof extending through the loop and connected to a free end of an electrical cord mounted on the handle thereby resisting being disconnected when in use; to provide such a vegetation trimming apparatus having spaced cord caddy portions adapted to have an extension cord extending therebetween and wound therearound for storage of the electrical extension cord; to provide such a vegetation trimming apparatus having switch means for activating the cutting components with the switch means being spring loaded to provide power only when held in an "on" position; to provide such a vegetation trimming apparatus wherein the spring loaded switch means is positioned for an operator to squeeze to the "on" position and to release to an "off" position; to provide such a vegetation trimming apparatus wherein alternate squeezing and releasing of the switch means may be employed to control cutting speed of the cutting components; and to provide such a vegetation trimming apparatus which is attractive in appearance, durable in construction, positive in operation, easy to use, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and illustrate an exemplary embodiment of the present invention and illustrate various objects and features of the apparatus for trimming vegetation.

FIG. 1 is a perspective view of a vegetation trimming apparatus embodying features of the present invention and shown in use.

FIG. 2 is a side elevational view of the vegetation trimming apparatus with the extension cord shown in a storage position.

FIG. 3 is an enlarged side elevational view of a gripping portion at an upper end of a handle with an extension cord retained therein.

FIG. 4 is a further enlarged bottom plan view of the trimmer structure portion of the vegetation trimming apparatus.

FIG. 5 is a still further enlarged sectional view of the trimmer structure portion taken on line 5—5 of FIG. 4.

FIG. 6 is an exploded perspective view of the drive components of the vegetation trimming apparatus on the same scale as FIG. 4.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative reparable basis for teaching one skilled in the art to variously employ the present invention in virtually any appropriately detailed structure.

Referring more in detail to the drawings:

The trimming apparatus has means for storing a coil of non-metallic cutting line with a free end portion thereof extending outwrdly from the coil. The trimming apparatus includes a line locating means having a portion spaced outwardly from the line storage means and engaging the free end portion of the line. The free end portion of the cutting line extends beyond the line locating means and defines a free traveling cutting end portion. The storage means and the line locating means have separable, normally engaging portions for rotation together and are selectively disengaged for relative rotation to pay out additional cutting line beyond the line locating means. The trimming apparatus includes electrically actuated driving means for rotating the storage means and the line locating means with the extending cutting line in a cutting plane substantially perpendicular to the axis of rotation.

In the disclosed embodiment of the present invention, the reference numeral 1 designates generally a vegetation trimming apparatus for trimming vegetation along driveways, sidewalks, and the like; around trees, and like landscaping; and adjacent fences, and the like. The vegetation trimming apparatus 1 includes a drive motor 2 positioned at one end of an elongated handle 3 and adapted to rotate a driven shaft 4 and a trimmer structure 5 having a spool member 6 with a cutting line member 7 coiled thereon and a non-coiled portion 8 of the line member 7 extending from the spool member 6. The trimmer structure 5 may be moved or turned relative to the driven shaft 4 to adjust amount of the cutting line member 7 extending therefrom for cutting vegetation.

In the illustrated structure, the handle 3 is an elongated tubular member having an upper end portion 12, an intermediate portion 13, and a lower end portion 14. The upper end portion 12 and the intermediate portion 13 are positioned to define an obtuse angle therebetween. The intermediate portion 13 and the lower end portion 14 are also positioned to define an obtuse angle therebetween. The upper end portion 12 of the handle 3 is positioned such that the axis thereof intersects the drive motor 2. This provides a handle wherein the upper portion is offset toward the operator from the line of the lower portion and in use the intermediate portion is generally horizontal all to aid handling and maneuvering the trimmer.

A swivel balance handle member 15 is pirovally mounted on the intermediate portion 13 and includes a rod portion 16 extending through and rotatable in the handle 3 and retained thereon by suitable retaining members such as lock nuts 16' and the like. The swivel handle member 15 is best seen in FIG. 5 and has an upper portion 17 adapted to be held by one hand of an operator of the vegetation trimming apparatus 1.

The handle 3 has a gripping portion or gripping member 18 mounted on the upper end portion 12 thereof. The gripping portion or member 18 has a first portion extending along the upper portion 12 of the handle 3 and an outwardly extending portion 19 adapted to be held by the other hand of the operator of the trimming apparatus 1.

The outwardly extending portion 19 has control means 20 mounted thereon and operatively connected to the power means or drive motor 2 and the control means 20 is adapted to selectively activate the drive motor 2. The control means 20 is illustrated as a switch electrically connected to the drive motor 2 which is an electric motor with an electrical cord 21 extending therefrom and having a free end portion thereof extending from adjacent the end of the outwardly extending portion 19 of the gripping member 18. The electric cord 21 preferably has a connector or plug 21' on the free end adapted to be connected to a source of electrical power by means of one or more electrical extension cords 22.

The control switch 20 is preferably a momentary contact type which is adapted to be moved to an "on" position by pressure on a switch lever or button and automatically moved to an "off" position when released. In operation, the drive motor 2 may be operated in a pulsating manner by pressing and releasing the control switch 20. Such operation results in a variable lower speed of operation that aids in seeing and determining the cut and in a very effective cutting of substantially all vegetation desired.

The outwardly extending portion 19 of the handle has an aperture 23 in the free end portion thereof as best seen in FIG. 3. The aperture 23 is adapted to receive therein a loop 24 of the extension cord 22 whereby a free end portion 25 of the extension cord 22 may be positioned to extend through the loop 24 and be connected to the free end of the electric cord 21. This forms a tie of the extension cord to the handle thereby resisting being disconnected when in use as any pull on the extension cord is transmitted to the handle and not the cord 21. With the cord lock illustrated in FIG. 3, there is no strain or only a minimum of strain on the free end portion 25 of the extension cord 22 or on the free end of the electrical cord 21.

The electric drive motor 2 is enclosed within a power housing 26 having a projection 27 extending therefrom and adapted to receive therein the lower end portion 14 of the handle 3. The drive motor 2 is capable of rotating the driven shaft 4 and the trimmer structure 5 at speeds of up to ten thousand (10,000) R.P.M.

The projection 27 and the first portion of the gripping member 18 have means thereon adapted to have the extension cord 22 extending therebetween and wound therearound for storage of the extension cord 22 when not in use. In the illustrated embodiment, cord caddy portions 28 and 29 extend from the projection 27 and the first portion of the gripping member 18 respectively. The cord caddy portions 28 and 29 have first portions 30 and 31 extending from and substantially perpendicular or normal to the projection 27 and the first portion of the gripping member 18 respectively. Retaining portions 32 and 33 extend from the first portions 30 and 31 and are spaced from the projection 27 and the first portion of the gripping member 18 respectively to define hooks having outwardly open pockets each adapted to receive therein respective portions of the extension cord 22, as best seen in FIG. 2.

The driven shaft 4 is operatively connected to the drive motor 2 and the trimmer structure 5 is mounted on the driven shaft 4 and is rotatable therewith. The trimmer structure 5 may be any suitable structure adapted to support and position the cutting line 7 in the cutting plane. The illustrated trimmer structure 5 has walls defining an internal compartment 34 therein and surrounding the driven shaft 4. In the illustrated embodiment, the trimmer structure 5 has an end wall 35 positioned adjacent the power housing 26 and the trimmer structure 5 has one wall 10 extending from the end wall 35 and defining a side wall of the housing 5. The side wall 10 defines a generally cylindrical internal compartment 34. The side wall 10 has an aperture 9 therein with the axis of the aperture 9 extending radially from the driven shaft 4. The surface defining the aperture 9 is preferably protected by a guide member of grommet 38 formed of suitable metal, such as brass or the like.

The trimmer structure 5 has a tubular portion 39 extending from an inner or interior surface of the end wall 35 and into the internal compartment 34. The tubular portion 39 is coaxial with and has the driven shaft 4 extending therethrough and beyond a free end 40 of the tubular portion 39. The free end 40 has a shoulder 41 thereon, for a purpose later described.

The trimmer structure 5 has a plurality of circumferentially spaced radially extending ribs 42 on an exterior surface of the end wall 35 thereby defining a fan-like structure adapted to effect air circulation for cooling the drive motor 2 when in use.

The spool member 6 may be any suitable member adapted to support thereon the cutting line 7 and the illustrated spool member, is positioned within the internal compartment 34 and is rotatable with the driven shaft 4. The illustrated spool member 6 has a body portion 43 with an axial bore 44 adapted to receive therein the tubular portion 39 of the trimmer structure 5. First and second flanges 45 and 46 are laterally spaced apart and extend outwardly from the body portion 43 and define a pocket or chamber for a coiled portion of the cutting line member 7. A side of the body portion 43 has a recess 47 positioned between the flanges 45 and 46 and the recess 47 is adapted to receive therein one end of the cutting line member 7.

The body portion 43 of the spool member 6 has a non-round recess 48 in an exterior surface thereof and the recess 48 is coaxial with the axial bore 44, for a purpose later described. The inwardly facing surface of the body portion 43 has an annular recess 49 therein which is also coaxial with the axial bore 44 and surrounds same, all for a purpose later described.

The driven shaft 4 extends through the tubular portion 39 and beyond the free end 40 thereof. The driven shaft 4 and the spool member 6 have means in engagement therewith for effecting rotation of the spool member 6 with the driven shaft 4.

In the illustrated embodiment, an end portion of the driven shaft 4 is threaded and is adapted to be received within a tubular socket portion 50 of a retaining member 51. The interior surface of the socket portion 50 is threaded whereby the retaining member 51 is adapted to be secured on the end portion of the driven shaft 4. The socket portion 50 has a free end 52 thereof adapted to be seated on the shoulder 41 on the free end 40 of the tubular portion 39 of the trimmer housing 5.

The retaining member 51 and the spool member 6 have cooperating portions in engagement one with the other whereby rotation of the driven shaft 4 and the retaining member 51 effects rotation of the spool member 6. In the illustrated embodiment, the retaining member 51 has a non-round head portion 53 corresponding to and adapted to be received in the non-round recess 48 in the exterior surface of the body portion 43 of the spool member 6. The illustrated recess 48 in the body portion 43 of the spool member 6 and the head portion 53 of the retaining member 51 are both square.

The body portion 43 of the spool member 6 is positioned between the end wall 35 of the trimmer structure 4 and the head portion 53 of the retaining member 51. Resilient means 43 extend between the end wall 35 of the trimmer structure 5 and the body portion 43 of the spool member 6 for resiliently holding the spool member 6 in spaced relation with the end wall 35 of the trimmer structure 5. The spool member 6 may be moved toward the end wall 35 of the trimmer structure 5 and turned relative to the retaining member head portion 53 and thereby adjust amount of cutting line member 7 extending through the aperture 9 in the side wall 10 of the trimmer structure 5. The resilient member 54 is illustrated as a coil or helical compression spring having one end portion thereof received in the annular recess 49.

The cutting line 7 is preferably non-metallic and formed of a suitable plastic, such as nylon and linearly oriented. The cutting line 7 may be formed by extrusion and is preferably non-circular or non-round with longitudinal ribs, as for example a cross section that is generally star shaped. This provides greater strength and rigidity for lower mass in the line. It is preferred that the line have a transverse dimension of from 0.030 inch to 0.160 inch, however a line size of from 0.025 inch up will cut vegetation when rotated at suitable speeds.

When the cutting line 7 is formed by extrusion of a suitable plastic and linearly oriented or otherwise treated, the cutting line 7 will be relatively stiff but have flexibility to bend under load without breaking. The cutting line 7 preferably has sufficient stiffness that the cutting portion extending from the spool member 6 remains in the plane of cutting both when stationary and during rotation. The line so formed is such that when supported on one end and extending for the cutting length thereof, the cutting line 7 will support more than its own weight without bending downwardly. These characteristics are preferable for any cross sectional shape of the line and the longitudinal ribs provide additional stiffness and strength facilitating cutting of heavier vegetation.

The drive motor 2 is preferably a series wound type and capable of rotating the motor or driven shaft 4 at speeds up to ten thousand (10,000) R.P.M. The larger the cross sectional size of the cutting line 7, the greater the power of the drive motor 2 required for operation. Therefore, for lightness of weight of the trimming apparatus 1, it is preferred that the maximum cross sectional size of the cutting line 7 be in the nature of 0.150 inch. Such a line size will cut heavy vegetation including heavy weed growth, Johnson grass, and other tough vegetation.

In using a trimming apparatus 1 constructed as illustrated and described, the extension cord 22 is removed from the cord caddy portions or hooks 28 and 29. A portion of the extension cord 22 adjacent the free end portion 25 thereof is positioned to form the loop 24 which is extended through the aperture 23 in the outwardly extending portion 19 of the gripping member 18. The free end portion 25 is extended through the loop 24 and connected to the electrical cord 21 and the other end of the extension cord 22 is connected to a suitable source of electrical power. One hand of the operator is placed on the gripping member 18 and the other hand is placed on the swivel balance handle member 15. The cutting head or power housing 26 is positioned adjacent vegetation desired to be trimmed. The control switch 20 is moved to an "on" position by squeezing and the trimming apparatus 1 is moved along the walk, curb, hedge, or the like or around trees, shrubs, posts, and the like as desired.

It is to be understood that while I have illustrated and described one form of my invention, it is not to be limited to the specific form or arrangement of parts herein described and shown.

What I claim and desire to secure by Letters Patent is:

1. An apparatus for trimming vegetation compising:
  a. drive means connected to a drive shaft and capable of rotating same at a speed of up to ten thousand (10,000) RPM;
  b. an open bottom housing member mounted at its central point on said driven shaft and rotatable thereby, said member having a peripheral wall portion spaced from said driven shaft with a radial passage therethrough;
  c. a relatively stiff non-metallic cutting line with suitable flexibility and a portion in a coil substantially coaxial of said driven shaft and an uncoiled portion extending initially tangentially from said coiled portion and through said radial passage and continuing radially outwardly in a cutting plane;
  d. spool means coaxially supported on said driven shaft and supporting said coil of cutting line, said spool means being movable longitudinally of said driven shaft and rotatable relative to said member for adjusting the length of cutting line extending outwardly of said radial passage;
  e. resilient means engaging said housing member and spool means to urge the spool means outwardly relative to said open bottom of the housing member; and
  f. means on said driven shaft and said spool means engageable to limit said outward movement of said spool means and to key same to said shaft for rotation therewith, said means on the driven shaft and spool means being released in response to predetermined inward movement of said spool means relative to said housing means to permit relative rotation thereof.

2. An apparatus as set forth in claim 1 wherein:
  a. said non-metallic cutting line is a linearly oriented nylon that is non-circular with longitudinally extending ribs and having an outer transverse dimension of not greater than 0.150 inches;
  b. the free line portion radially outwardly of said radial passage is less than four inches; and
  c. said cutting line has a stiffness that said free portion extends substantially in said cutting plane at all speeds including low operating speeds.

3. An apparatus as set forth in claim 1 including:
  a. a motor housing enclosing said drive means, said housing being centered on the axis of said driven shaft and having said open bottom housing member adjacent one end of the motor housing, said one end normally being a lower end of the motor housing in cutting operations;

b. an elongated handle having offset upper and lower portions and an intermediate portion connecting said upper and lower portions;
c. means fixing said lower handle portion to said housing whereby said lower handle portion is inclined upwardly and outwardly relative to said axis and said intermediate handle portion is inclined outwardly at a greater angle to position said upper handle portion at a greater spacing outwardly than said lower handle portion;
d. a grip member fixed on the upper handle portion and extending outwardly therefrom and generally normal to said axis for holding by one had of an operator, said grip member and said upper and intermediate and lower handle portions all being in a single plane which intersects the axis of said driven shaft; and
e. a second grip member above said intermediate handle portion and secured thereto by a swivel connection, said second grip member being held by the other hand of an operator in maneuvering and supporting the apparatus in cutting operations.

4. An apparatus as set forth in claim 3 wherein:
a. said drive means includes an electric motor and an electric cord extending therefrom and adapted to be connected to a source of electrical power by means of electrical extension cord means;
b. said electrical cord has a free end portion extending from said first named grip member; and
c. said first named grip member has a free end portion with an aperture therein and adapted to receive therein a loop of the extension cord means whereby a free end portion of the extension cord means may be positioned extending through the loop and connected to the free end of said electrical cord thereby resisting being disconnected when in use.

5. An apparatus as set forth in claim 3 wherein:
a. said drive means includes an electric motor and an electrical cord extending therefrom and adapted to be connected to a source of electrical power by means of electrical extension cord means; and
b. opposed hook means on said housing enclosing said drive means and on said first named grip member for receiving an electrical extension cord extending therebetween and wound therearound for storage of the electrical extension cord.

6. An apparatus as set forth in claim 1 wherein:
a. said open bottom housing member has an upper wall and a tubular portion extending downwardly therefrom and a shoulder on a free end thereof;
b. said driven shaft extends through said tubular portion of said member and has an end portion extending beyond said shoulder on the free end of said tubular portion;
c. said means to key said spool means to said driven shaft for rotation therewith includes a retaining member having a tubular socket portion thereof secured on the end portion of said driven shaft and seated on the free end of said tubular portion of said housing member;
d. said spool member having a body portion;
e. said means on said driven shaft and said spool means include:
 1. a non-round head portion on said retaining member; and
 2. a non-round recess in an exterior surface of said spool member and adapted to receive therein said head portion of said retaining member.

7. An apparatus for trimming vegetation comprising:
a. a relatively stiff non-metallic cutting line having suitable flexibility;
b. means for storing said cutting line in a coil with an end portion extending outwardly from the coil;
c. a line locating means having a portion spaced outwardly of said storage means and engaging said line extending therefrom, said line extending radially outwardly from said line locating means and forming a free traveling cutting end portion;
d. means normally engaging portions of said storage means and said line locating means for effecting rotation thereof together, said portions of said storage means and said line locating means being selectively disengageable for relative rotation between said line locating means and said storage means to pay out additonal cutting line;
e. electrically activated drive means for rotating said storage means and said line locating means with said free traveling cutting line being in a cutting plane substantially perpendicular to the axis of rotation;
f. said line locating means including a trimmer housing having walls defining an internal compartment therein and surrounding the axis of rotation with one of said compartment defining walls having an aperture therein extending substantially radially from the axis of rotation and substantially in a plane with the line storage means;
g. said trimmer housing having a tubular portion extending into said compartment and having a shoulder on a free end thereof;
h. said drive means includes a driven shaft extending through said tubular portion of said trimmer housing and having an end portion thereof extending beyond said shoulder on the free end of said tubular portion;
i. said means for effecting rotation of said storage means and said line locating means together includes a retaining member having a tubular socket portion thereof secured on the end portion of said driven shaft and seated on the free end of said tubular portion of said trimmer housing, said storage means including a spool member positioned in said compartment, coaxially supported on said driven shaft and movably mounted on said tubular portions of the trimmer housing and retainer member;
j. said retaining member and said spool member having cooperating portions in engagement one with the other whereby rotation of said driven shaft and said retaining member effects rotation of said spool member; and
k. resilient means extending between the other of said compartment defining walls of said trimmer housing and said spool member whereby said spool member may be moved toward the other of said compartment defining walls of said trimmer housing and turned relative to said retaining member to adjust the amount of said cutting line extending through said aperture in said one trimmer housing wall.

* * * * *